Jan. 26, 1960     E. A. SACK, JR     2,922,993
DISPLAY DEVICE
Filed Feb. 5, 1958     3 Sheets-Sheet 2
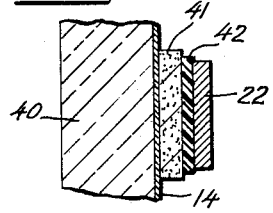
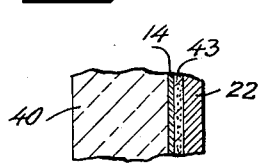
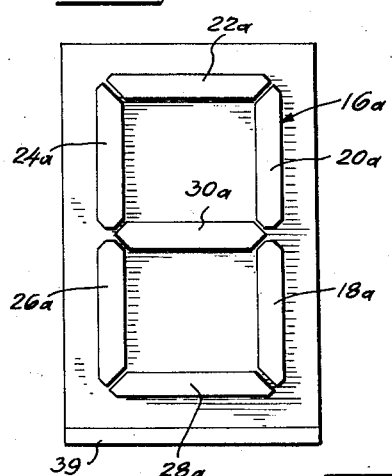
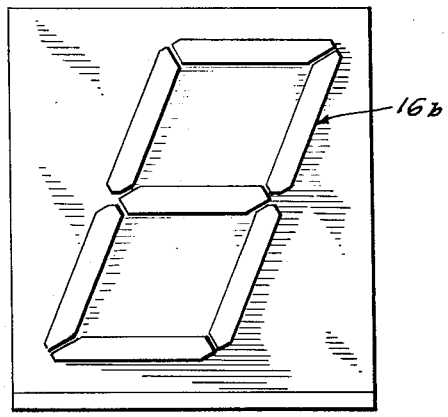
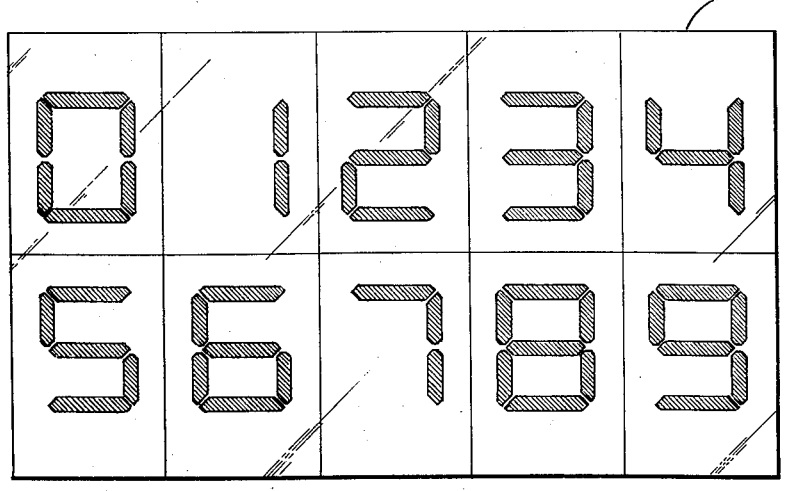
INVENTOR.
EDGAR A. SACK, Jr.
BY W. D. Palmer
ATTORNEY.

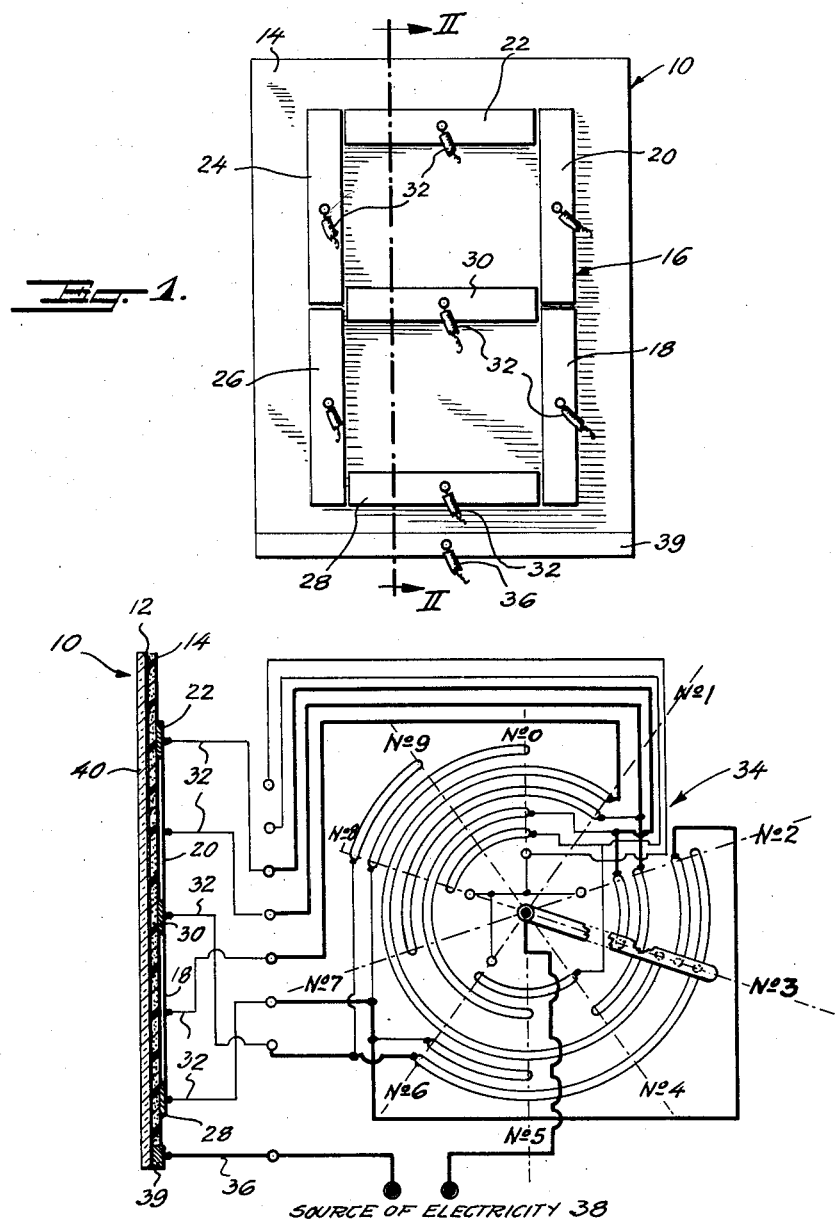

Jan. 26, 1960  E. A. SACK, JR  2,922,993
DISPLAY DEVICE
Filed Feb. 5, 1958  3 Sheets-Sheet 3

INVENTOR.
EDGAR A. SACK, Jr

BY *W. D. Palmer*

ATTORNEY

United States Patent Office 2,922,993
Patented Jan. 26, 1960

2,922,993

DISPLAY DEVICE

Edgar A. Sack, Jr., Pittsburgh, Pa., assignor to Westinghouse Electric Corporation, East Pittsburgh, Pa., a corporation of Pennsylvania Application February 5, 1958, Serial No. 713,429

9 Claims. (Cl. 340—324)

This invention relates to display devices and, more particularly, to an electroluminescent digital-display device.

Digital displays have been used for many years with one of the best-known digital-display devices being the common cash register. Within recent years, the advancing technology has required digital displays which are simple, rugged, easily installed and replaced and fast in response, while still having small space requirements and low power consumption. For many of these applications, analog-type displays have been used, but this type display has proved unsatisfactory in many cases. In addition, the accuracy of the reading which can be represented with a digital display is limited only by the design of the switching equipment which controls the display, as contrasted to the usual analog-display device. Examples of excellent applications for digital displays are modern computers, display devices for recording the operation of complex equipment and stock-quotation boards.

Digital-display devices of the prior art have comprised large display boards fabricated of incandescent lamp groupings, for example, which are adapted to be energized according to a preselected pattern to produce the desired digits. In addition, digital displays for stock-quotation boards, for example, have been fabricated of a plurality of conformed neon lamps, wherein each numeral is separately formed from an individual neon lamp. Also suggested have been digital displays formed from glow-discharge devices.

In the case of digital displays formed from incandescent lamp groupings, the resulting displayed numerals comprise a series of points of light which impairs the continuity of the formed numerals and in addition, many electrical connections are required for the lamps comprising the display. Such incandescent lamp displays are necessarily quite large if the resulting digits are to be reasonably well formed. Where relatively small displays are desired, the problems of miniaturization and electrical connection for a plurality of incandescent sources renders such displays impractical, as well as poor in appearance, since insufficient incandescent light sources can be used to form properly-appearing numerals.

In the case of neon-lamp digital displays, and particularly those of small size, the practical construction features of the neon lamps normally necessitate that each numeral be separately fabricated. In some cases, these separately-fabricated numerals have been superimposed on top of one another so that any numeral can be displayed from one location. Apart from constructional difficulties and expense, this has the disadvantage that the numeral which is positioned at the bottom of the numeral stack is impaired with respect to legibility and after the digital display has operated for some time, the neon lamps become increasingly hard to start due to their relatively high temperature. In addition, even the simplest discharge lamp displays require cumbersome and expensive ballast and starting equipment.

Glow-discharge devices likewise normally require a ballast arrangement as a safety measure and are generally cumbersome with respect to electrical connections. In addition, they require an additional anode to cooperate with the cathode surface intended to be light emitting. In view of the inherent limitations of the present-existing digital displays, small-size digital displays have been relatively poor in performance and accordingly limited in their use.

In order to overcome the foregoing and other difficulties of and objections to the prior-art practices, it is a general object of this invention to provide an electroluminescent digital-display device.

It is a further object to provide an electroluminescent digital-display device which may be fabricated in very small size with small space requirements, wherein the resulting displayed numerals are well formed and are very legible.

It is another object to provide an electroluminescent digital-display device which may be fabricated with a minimum of electrical connections in order to simplify installation, construction and maintenance and in which device the operation is very positive.

It is an additional object to provide an electroluminescent digital display which may simultaneously present a plurality of indicia.

It is a still further object to provide alternative embodiments for the electroluminescent digital display.

The aforesaid objects of the invention, and other objects which will become apparent as the description proceeds, are achieved by providing an electroluminescent digital-display device for presenting any preselected numerical digit. In its preferred form this display device comprises a light-transmitting, electrically-conducting electrode having superimposed thereover a field-responsive phosphor material. Superimposed over this phosphor material is a composite second electrode which is comprised of seven electrically-conducting principal members formed as a composite figure eight. The principal members comprising the figure eight are so arranged that by selectively energizing and deenergizing these seven members, any numeral from zero to nine can be presented, since upon energization of the preselected second electrode members, an electric field is created between the energized principal members and the first electrode. This causes the field-responsive or electroluminescent phosphor portions within the influence of the resulting electric field to electroluminesce to present in an illuminated fashion the preselected digit.

For a better understanding of the invention reference should be had to the accompanying drawings wherein:

Fig. 1 is an elevational view of the back portion of an electro-luminescent digital-display device;

Fig. 2 is a sectional side elevation taken on the line II—II in Fig. 1 in the direction of the arrows showing constructional details for the display device and this view includes a diagrammatic view of a selector switch for energizing the display device.

Fig. 3 is a sectional fragmentary enlargement of a display device, illustrating an alternative embodiment of the device as shown in Fig. 2;

Fig. 4 is a sectional fragmentary enlargement corresponding to Fig. 2 and illustrates a still-further alternative embodiment;

Fig. 5 is an elevational view corresponding to Fig. 1, and shows an alternative embodiment wherein the end portions of the principal members comprising the composite electrode are conformed so as to improve the appearance of the resulting digits when presented;

Figure 8:
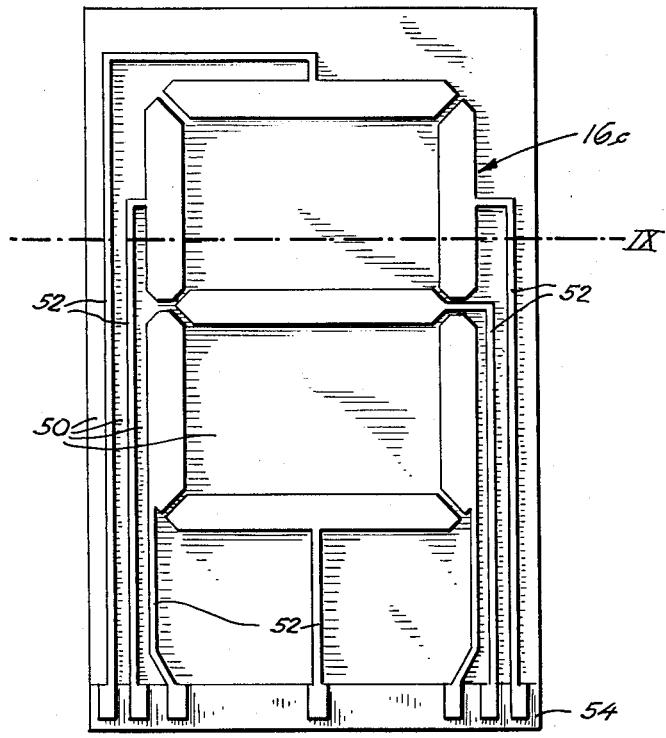
Figure 9:
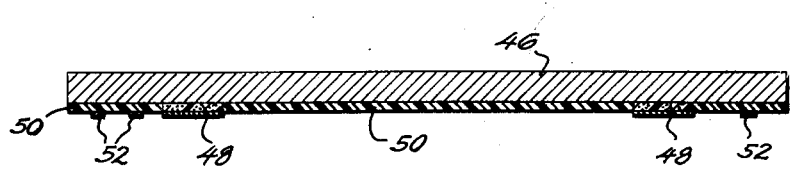

Fig. 6 corresponds to Fig. 5, but illustrates an alternative embodiment for the composite electrode configuration of the display unit;

Fig. 7 shows a front view of a composite ten-unit display wherein the displayed numerals are preselected so as to present all the numerals from zero to nine;

Fig. 8 is an elevational view of the front portion of a display device, illustrating a further alternative embodiment wherein the front, light-transmitting electrode is formed of a plurality of members;

Fig. 9 is an enlarged sectional view of the device shown in Fig. 8, taken on the line IX—IX.

With specific reference to the form of the invention illustrated in the drawings, in Figs. 1 and 2 are illustrated the constructional features for a simple form of an electroluminescent digital-display device 10. The unit generally comprises a light-transmitting, electrically-conducting layer 12, which serves as a first electrode, with a layer 14 thereover comprising electroluminescent phosphor material. The phosphor layer 14 carries thereon a composite second electrode 16 which comprises seven principal members 18, 20, 22, 24, 26, 28 and 30, so positioned with respect to one another to form a substantially straight-sided composite figure eight. The composite figure eight is formed in part by two riser portions, each of which comprises two of the second-electrode principal members 18, 20 and 24, 26, spaced slightly apart and disposed in a substantially straight line. These riser portions of the composite figure eight are substantially bridged at locations proximate their ends and midpoints by three substantially parallel and spaced transverse portions, which are formed by the remaining three principal members 22, 28 and 30 which comprise the composite second electrode 16. All of the principal members which comprise the composite second electrode 16 are electrically insulated from one another and are adapted to have an electrical potential separately applied thereto through separate electrically-conducting leads 32 which may be soldered to the principal members comprising the second electrode 16. The proximate ends of the principal members which comprise the second electrode 16 are spaced slightly apart and the minimum spacing required will be considered hereinafter. The composite second electrode 16 is thus spaced proximate the first electrode 12 with the layer 14 comprising the electroluminescent phosphor material positioned therebetween. For uniform brightness of the presented numerals, it is desirable that the first electrode and the principal members comprising the second electrode are substantially parallel, but if graded brightness intensities in the presented numerals are desired or may be tolerated, the first and second electrodes need not be parallel.

A selector switch 34 may be used to energize the device 10 to display the preselected numeral. The illustrated switch is only representative of one type of switching arrangement as may be used and this conventional selector switch may be replaced by mechanically- or electronically-operated computer outputs, for example. An additional lead connector 36 also connects the first electrode 12 through a source of potential 38 to the selector switch 34. Electrical connection between the lead 36 and the first electrode 12 may be made by soldering or by a busbar 39, for example, such as described in U.S. Patent No. 2,628,299. Each of the leads 32 connecting to the individual principal members comprising the second electrode 16 are so connected to the indicated numerical indicia on the selector switch 34 that upon switching to the desired indicia, the electrical potential required to create electroluminescence will be applied between the first electrode 12 and the appropriate preselected principal members which comprise the second electrode 16. As an example, if the numeral "one" is to be presented, a potential is applied between the first electrode 12 and the principal members 24 and 26 of the second electrode. If the numeral "two" is to be presented, the potential will be applied between the first electrode 12 and the principal members 22, 24, 30, 18 and 28 of the second electrode, since the presented numerals are backward as viewed from the back of the device as in Fig. 2. In the illustrated operation of the selector switch 34, the numeral "three" is selected. The other numerals may likewise be presented and only eight lead connections are required to present any preselected numeral. Electrical connection to the first electrode 12 may be effected through ground, if desired.

In the embodiment as illustrated in Fig. 1, the first electrode 12 may comprise a thin, light-transmitting, electrically-conducting layer of tin oxide which may be applied to a glass foundation 40, for example. Such electrically-conducting coatings are very well known in electroluminescent devices and other materials such as indium oxide, bismuth oxide and aluminum oxide, for example, may be substituted in place of the tin oxide. The phosphor material 14 may comprise any electroluminescent phosphor material, which phosphors are energizable by electric fields to produce visible light and accordingly are generally termed "field responsive." As a specific example, the electroluminescent material may comprise zinc sulfide activated by copper and coactivated by chlorine. Such a phosphor may be prepared by admixing one mole of finely-divided zinc sulfide with 0.0125 mole of finely-divided copper chloride. The admixture is then fired in the presence of sulphur vapor at a temperature of about 900° C. for about 1 hour. Thereafter, the fired mixture may be washed in a one-normal solution of sodium cyanide and dried. This will produce an excellent green-emitting electroluminescent phosphor. While this specific example has been carried through in detail, it should be understood that any suitable electroluminescent phosphor may be substituted therefor and for further examples, reference is made to Destriau and Ivey article titled "Electroluminescence and Related Topics," Vol. 43, No. 12, December 1955, "Proceedings of the I.R.E." In applying the phosphor to the glass foundation which carries the electrically-conducting layer to form the first electrode 12, the phosphor may be admixed with an equal proportion by weight of a suitable dielectric material such as polyvinyl-chloride acetate and sprayed onto the first electrode 12 by conventional techniques. Any suitable dielectrical material which is light-transmitting may be substituted in place of the foregoing specific example, such as methyl methacrylate or polystyrene, for example. Also, the part by weight of phosphor with respect to the dielectric material is in no way critical and may be varied over an extremely wide range.

While the instant display device is not limited in the size in which it can be fabricated, it is particularly adapted for small displays and as an example the first electrode 12 may have dimensions of three inches by four inches. The dimensions of the composite second electrode 16 may be varied considerably according to the type of numerals which are to be displayed. As an example, all of the second-electrode principal members may have dimensions of 1½ inches by ¼ inch. The thickness of the phosphor-dielectric layer 14 may be varied over a wide range, depending in part upon the field intensity which is to be applied across the cell, but for 110 volt operation, a thickness of one mil has been found to be very satisfactory. It should be understood that the instant display device can be made considerably smaller, if desired, and the composite second electrode 16 may have a total height of only 0.25 inch and total width of only 0.067 inch, for example. In such an embodiment, a spacing of one mil between the principal members comprising the composite second electrode will be adequate. Thus the only practical limit to the miniaturization of the display is the visual perception of the person using same. The adaptability of the instant display device to miniaturization is to be contrasted to the digital-display devices of the prior art.

The composite second electrode 16 is preferably applied by means of vacuum-metalizing techniques, as are well known, wherein a suitably-conformed templet may be placed over the phosphor-dielectric layer 14 in order to screen those portions of the phosphor-dielectric layer which are not to have electrode material coated thereover. As a specific example, the second electrode may be formed of vacuum-metallized aluminum or silver although other electrically-conducting materials may be substituted if desired. The spacing between proximate ends of the individual members comprising the second electrode 16 need only be such that they are electrically insulated from one another, such as a spacing of from 1 to 3 mils for example. Of course this spacing can be varied considerably if desired, although the closer the spacing the better the appearance of the resulting formed numerals.

In Fig. 3 is shown an alternative embodiment wherein the phosphor material and dielectric material are applied as separate layers. In this embodiment the separate phosphor layer 41 and dielectric layer 42 are also applied in an interrupted fashion and positioned between the first and second electrodes of the display device. Such a construction effects some savings in material and desirably the separate phosphor and dielectric layers extend slightly beyond the principal members comprising the composite second electrode 16 to prevent any tendency for electrical breakdown. When an interrupted-type of phosphor layer is utilized, the phosphor material desirably is admixed with a small amount of a suitable binder such as nitrocellulose. It should be understood that separate phosphor and dielectric material layers could be utilized in a construction as shown in Fig. 2. Also, the continuous layer 14 of admixed phosphor and dielectric material, as shown in Fig. 2, could be applied as an interrupted layer as shown in Fig. 3. Under some conditions, the dielectric material may be dispensed with entirely, although this increases the chances for electrical breakdown across the cell electrodes where powdered phosphors are used.

In Fig. 4 is illustrated a still-further alternative embodiment wherein the field-responsive phosphor material such as ZnS:Cu:Cl may be deposited as a thin film 43, which for 110 volt operation may have a thickness of one micron, for example. Thin-film phosphor deposition may be accomplished by a technique as disclosed in Feldman and O'Hara article titled "Formation of Luminescent Films by Evaporation," "Journal of the Optical Society of America," volume 47, No. 4, pages 300–305 (April 1957). With thin-film phosphors, it is not necessary to provide additional dielectric material although additional dielectric layers may be provided, if desired, if alternating current is used to energize the display device. The embodiment as shown in Fig. 4 will operate either on A.C. or D.C. such as sixty cycle 110 volt A.C. or 110 volt D.C.

In Fig. 5 is shown an alternative embodiment for the composite second electrode 16a (with lead connectors omitted) wherein the proximate end portions of the principal members 18a, 20a, 22a, 24a, 26a, 28a and 30a which comprise this second electrode are conformed at substantially complementary angles. Accordingly, the conformed end portions of the principal members which are proximate one another will be substantially parallel. By this construction the appearance of the resulting formed numerals is improved. As illustrated, the end portions of the principal members comprising the second electrode 16a are desirably conformed at an angle of approximately 45°. This angle may be varied considerably, if desired, to vary the appearance of the resulting numerals.

In Fig. 6 is shown an embodiment which corresponds to Fig. 5 except that the substantially straight-sided composite figure eight, which forms a further alternative second electrode 16b, is conformed as a parallelogram rather than a rectangle, desirably including acute angles of 67½°.

In Fig. 7 is shown a composite display unit 44 which comprises a plurality of units as disclosed in Fig. 5. For purposes of illustration this composite display unit has been formed of ten individual units and each of these units has been energized to produce a different numerical digit. As shown in Fig. 7, the resulting numerical indicia are very well formed and easy to read, even with relatively small numerals. The spacing between the illuminated segments comprising the presented numerals is very small and in the case of a three inch numeral, for example, this spacing may be made so small as not to be visible at any appreciable distance, such as two feet or more. This is not possible with incandescent digital-display devices wherein the individual light sources comprising the display device detract from the general appearance and legibility of the display. Also, where small displays are required, practical construction of an incandescent digital display is not possible. As a further feature, the instant display device may be operated on a start-and-stop basis in a continual fashion as the starting of the device is not affected by increased temperature.

In the embodiments illustrated in Figs. 1 and 2, the first electrode 12 has been formed of a single light-transmitting, electrically-conducting layer. For some applications, it might be desirable to form the first electrode means 12 from more than one side-by-side layer so that plural individual first electrode layers would cooperate with one or more of the principal members comprising the second electrode means 16. In such an embodiment, the spacing between the individual light-transmitting, electrically-conducting layers which comprised the first electrode means 12 would desirably coincide with spacings between the individual principal members which comprised each composite figure eight of each second electrode.

In the embodiment as shown in Fig. 7, each of the plurality of display units which comprise the composite ten-unit display are preferably fabricated as individual units, wherein a single first electrode cooperates with one composite figure eight second electrode to present the preselected numerals. It is also possible to fabricate the composite unit shown in Fig. 7 in such a manner that one relatively large first electrode is utilized. Thus more than one composite figure eight can cooperate with a large single first electrode in order to produce the composite display.

In Figs. 8 and 9 are shown another embodiment of the display device wherein the composite figure eight electrode 16c is made light transmitting in nature. In such a design, the back electrode 46 may be made continuous and may be fabricated of aluminum or steel, for example. The electroluminescent phosphor material may be admixed with a ceramic-type dielectric and conformed in a preselected manner so as to have the configuration of the composite figure eight which is adapted to be light-emitting in nature. For facility of fabrication, the areas surrounding the ceramic-phosphor 48 may be provided with a layer 50 of ceramic material per se. The preformed ceramic-phosphor 48 may be fabricated of material as described in U.S. Patent No. 2,857,541. This ceramic-phosphor may be formed directly onto the back electrode 46 and the layer 50 of ceramic material per se which surrounds the ceramic-phosphor 48 may be formed of any of the ceramic materials as described in Patent No. 2,857,541. Alternatively, any transparent, low-melting, enameling glass having a coefficient of expansion suitable to match the back electrode 46 may be utilized. Over the "figure eight" ceramic-phosphor layer 48 is provided a composite light-transmitting, electrically-conducting electrode 16c and this composite electrode may be formed of tin oxide, for example, and applied in preselected pattern to form the composite figure eight. The composite pattern may readily be achieved with a masking technique and spraying techniques for depositing such light-transmitting, electrically-conducting coatings are well known. Electrical connection to the individual principal members which comprise the composite front electrode 16c may be effected by individual light-transmitting, electrically-conducting lead connections 52, which may be deposited with a masking technique simultaneous with the deposition of the electrically conducting principal members which comprise the composite light-transmitting electrode 16c. Each of the electrically-conducting leads 52 may extend to an electrical connection board 54 in order to facilitate electrical connection to the device. During the operation of the unit as disclosed in Figs. 8 and 9, an electrical field will be generated between the back electrode member 46 and the leads 52, but since no phosphor is included therebetween, no light will be emitted in these areas. The light-transmitting, electrically-conducting leads 52 could be replaced by solid wire electrical connections, if desired.

It will be recognized that the objects of the invention have been achieved by providing an electroluminescent digital-display device which may be fabricated in very small size with very small space requirements in order to produce legible and well-formed numerical indicia. A minimum of electrical connections are required which simplifies construction, installation and maintenance and the operation of the unit is very positive since starting of the electroluminescent display device is independent of the number of times the unit is started as well as the temperature of the device.

As a further possible embodiment, the numerical indicia may be augmented by various other indicia, such as plus or minus signs, decimal points, commas, etc. In addition, small auxiliary electrode members may supplement the composite second electrode and be positioned at either extremity of the middle transverse member 30a of the composite figure eight as shown in Fig. 5, for example. These will improve the appearance of the resulting formed numerals since the spacing will be substantially eliminated between the individual principal members 18a, 20a and 24a, 26a comprising the riser portions and between these riser-portion members and the middle transverse member 30a. Even in such an embodiment, however, the composite figure eight will still be comprised of seven principal members, since it is these seven principal members which are primarily effective in forming the desired numerical indicia.

As an additional embodiment, the plastic dielectric utilized in the embodiment shown in Fig. 1 may be replaced by a ceramic dielectric such as disclosed in Patent No. 2,857,541. In ceramic-type cells, the glass foundation may be eliminated, and both front and back electrodes made light transmitting in nature, if desired.

While in accordance with the patent statutes, one best-known embodiment of the invention has been illustrated and described in detail, it is to be particularly understood that the invention is not limited thereto or thereby.

I claim:

1. A digital display device for forming in a preselected manner any numerical digit, comprising a first electrode means, a composite second electrode means spaced proximate to but apart from said first electrode means, at least one of said electrode means being light transmitting, seven substantially-straight electrically-conductive principal members electrically insulated from one another comprising said second electrode means, a material comprising electroluminescent phosphor means between said first electrode means and said principal members, a substantially straight-sided composite figure eight formed by said principal members, said figure eight comprising two substantially parallel and spaced riser portions substantially bridged at locations proximate their ends and midpoints by substantially parallel and spaced transverse portions, each of the riser portions of said figure eight comprising two of said principal members which are spaced slightly apart and disposed in substantially straight-line configuration, the transverse portions of said figure eight formed by the remaining three of said principal members, and said first electrode means and preselected combinations of said principal members adapted to have an electrical potential applied thereacross to create electric fields therebetween, whereby electroluminescent phosphor portions within the influence of the resulting electric fields cause the corresponding preselected portions of said composite figure eight to be illuminated.

2. A display device for forming in a preselected manner any numerical digit, comprising a light-transmitting electrically-conductive first electrode means, a composite second electrode means spaced proximate to but apart from said first electrode means, seven substantially-straight electrically-conductive principal members electrically insulated from one another comprising said second electrode means, a material comprising electroluminescent phosphor between said first electrode means and said principal members, a substantially straight-sided composite figure eight formed by said principal members, said figure eight comprising two substantially parallel and spaced riser portions substantially bridged at locations proximate their ends and midpoints by substantially parallel and spaced transverse portions, each of the riser portions of said figure eight comprising two of said principal members which are spaced slightly apart and disposed in substantially straight-line configuration, the transverse portions of said figure eight formed by the remaining three of said principal members, and said first electrode means and preselected combinations of said principal members adapted to have an electrical potential applied thereacross to create electric fields therebetween, whereby electroluminescent phosphor portions within the influence of the resulting electric fields cause the corresponding preselected portions of said composite figure eight to be illuminated.

3. A display device for forming a preselected digital display, comprising a light-transmitting electrically-conductive first electrode, at least one composite second electrode spaced proximate to but apart from said first electrode, seven substantially-straight electrically-conductive principal members electrically insulated from one another comprising each said second electrode, a material comprising electroluminescent phosphor between said first electrode and the principal members comprising each said second electrode, a substantially straight-sided composite figure eight formed by the principal members comprising each said second electrode, each said figure eight comprising two substantially parallel and spaced riser portions substantially bridged at locations proximate their ends and midpoints by substantially parallel and spaced transverse portions, each of the riser portions of each said figure eight formed by two of said principal members which are spaced slightly apart and disposed in substantially straight-line configuration, the transverse portions of each said figure eight formed by the remaining three principal members comprising each said second electrode, and said first electrode means and preselected combinations of the principal members comprising each said second electrode adapted to have an electrical potential applied thereacross to create electric fields therebetween, whereby electroluminescent phosphor portions within the influence of the resulting electric fields cause the corresponding preselected portions of each said composite figure eight to be illuminated.

4. A digital-display device comprising at least one display unit for forming a preselected numerical display, each display unit comprising, a light-transmitting electrically-conductive first electrode means, a composite second electrode means spaced proximate to but apart from said first electrode means, seven substantially-straight electrically-conductive principal members electrically insulated from one another comprising said second electrode means, a material comprising electroluminescent phosphor between said first electrode means and said principal members, a substantially straight-sided composite figure eight formed by said principal members, said figure eight comprising two substantially parallel and spaced riser portions substantially bridged at locations proximate their ends and midpoints by substantially parallel and spaced transverse portions, each of the riser portions of said figure eight comprising two of said principal members which are spaced slightly apart and disposed in substantially straight-line configuration, the transverse portions of said figure eight formed by the remaining three of said principal members, said first electrode means and preselected combinations of said principal members adapted to have an electrical potential applied thereacross to create electric fields therebetween, and in the case said display device comprises more than one display unit, each of the units comprising said display arranged in predetermined disposition with respect to one another, whereby upon energization of said display according to a predetermined schedule the resulting indicia will be presented according to a predetermined schedule.

5. A digital-display device for forming in a preselected manner any numeral from zero to nine, comprising a light-transmitting electrically-conductive first electrode, a composite second electrode spaced slightly apart from and substantially parallel to said first electrode, seven substantially-straight electrically-conductive principal members electrically insulated from one another comprising said second electrode, a material comprising electroluminescent phosphor between said first electrode and said principal members, a substantially straight-sided composite figure eight formed by said principal members, said figure eight comprising two substantially parallel and spaced riser portions substantially bridged at locations proximate their ends and midpoints by substantially parallel and spaced transverse portions, each of the riser portions of said figure eight comprising two of said principal members which are spaced slightly apart and disposed in substantially straight-line configuration, the transverse portions of said figure eight formed by the remaining three of said principal members, and said first electrode and preselected combinations of said principal members adapted to have an electrical potential applied thereacross to create electric fields therebetween, whereby electroluminescent phosphor portions within the influence of the resulting electric fields cause the corresponding preselected portions of said composite figure eight to be illuminated.

6. A digital-display device for forming in a preselected manner any numeral from zero to nine, comprising a light-transmitting electrically-conductive first electrode, a composite second electrode spaced proximate to but apart from said first electrode, seven substantially-straight electrically-conductive principal members electrically insulated from one another comprising said second electrode, a material comprising electroluminescent phosphor between said first electrode and said principal members, a substantially straight-sided composite figure eight formed by said principal members, said figure eight comprising two substantially parallel and spaced riser portions substantially bridged at locations proximate their ends and midpoints by substantially parallel and spaced transverse portions, each of the riser portions of said figure eight comprising two of said principal members which are spaced slightly apart and disposed in substantially straight-line configuration, the transverse portions of said figure eight formed by the remaining three of said principal members, at least a part of proximate end portions of said principal members conformed at substantially complementary angles, and said first electrode and preselected combinations of said principal members adapted to have an electrical potential applied thereacross to create electric fields therebetween, whereby electroluminescent phosphor portions within the influence of the resulting electric fields cause the corresponding preselected portions of said composite figure eight to be illuminated.

7. A digital-display device for forming in a preselected manner any numeral from zero to nine, comprising a light-transmitting electrically-conductive first electrode, a composite second electrode spaced proximate to but apart from said first electrode, seven substantially-straight electrically-conductive principal members electrically insulated from one another comprising said second electrode, electroluminescent phosphor and a dielectric between said first electrode and said principal members, a substantially straight-sided composite figure eight formed by said principal members, said figure eight comprising two substantially parallel and spaced riser portions substantially bridged at locations proximate their ends and midpoints by substantially parallel and spaced transverse portions, each of the riser portions of said figure eight comprising two of said principal members which are spaced slightly apart and disposed in substantially straight-line configuration, the transverse portions of said figure eight formed by the remaining three of said principal members, and said first electrode and preselected combinations of said principal members adapted to have an electrical potential applied thereacross to create electric fields therebetween, whereby electroluminescent phosphor portions within the influence of the resulting electric fields cause the corresponding preselected portions of said composite figure eight to be illuminated.

8. A digital-display device for forming in a preselected manner any numeral from zero to nine, comprising a light-transmitting electrically-conductive first electrode, a composite second electrode spaced proximate to but apart from said first electrode, seven substantially-straight electrically-conductive principal members electrically insulated from one another comprising said second electrode, a material comprising thin-film electroluminescent phosphor between said first electrode and said principal members, a substantially straight-sided composite figure eight formed by said principal members, said figure eight comprising two substantially parallel and spaced riser portions substantially bridged at locations proximate their ends and midpoints by substantially parallel and spaced transverse portions, each of the riser portions of said figure eight comprising two of said principal members which are spaced slightly apart and disposed in substantially straight-line configuration, the transverse portions of said figure eight formed by the remaining three of said principal members, and said first electrode and preselected combinations of said principal members adapted to have an electrical potential applied thereacross to create electric fields therebetween, whereby electroluminescent phosphor portions within the influence of the resulting electric fields cause the corresponding preselected portions of said composite figure eight to be illuminated.

9. A digital display device for forming in a preselected manner any numerical digit, comprising a first electrode means, a composite second electrode means spaced proximate to but apart from said first electrode means, at least one of said electrode means being light transmitting, a plurality of substantially-straight electrically-conductive principal members electrically insulated from one another comprising said second electrode means, a material comprising electroluminescent phosphor means between said first electrode means and said principal members, a substantially straight-sided composite figure eight formed by said principal members, said figure eight comprising two substantially parallel and spaced riser portions substantially bridged at locations proximate their ends and midpoints by substantially parallel and spaced transverse portions, each of said riser portions of said figure eight comprising two of said principal members which are spaced slightly apart and disposed in substantially straight-line configuration, the transverse portions of said figure eight formed by the remaining of said principal members, and said first electrode means and preselected combinations of said principal members adapted to have an electrical potential applied thereacross to create electric fields therebetween, whereby electroluminescent phosphor portions within the influence of the resulting electric fields cause the corresponding preselected portions of said composite figure eight to be illuminated.

References Cited in the file of this patent

UNITED STATES PATENTS 2,290,261    Welsh _____ July 21, 1942

OTHER REFERENCES

Publication "Illuminating Engineering," November 1950, pages 688–693.